(12) United States Patent
Chard et al.

(10) Patent No.: US 6,996,015 B2
(45) Date of Patent: Feb. 7, 2006

(54) FIRST-IN FIRST-OUT MEMORY SYSTEM WITH SINGLE BIT COLLISION DETECTION

(75) Inventors: Gary F. Chard, Richardson, TX (US); T-Pinn R. Koh, Allen, TX (US); Osman Koyuncu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 200 days.

(21) Appl. No.: 10/726,887

(22) Filed: Dec. 3, 2003

(65) Prior Publication Data

US 2005/0122793 A1 Jun. 9, 2005

(51) Int. Cl.
*G11C 7/00* (2006.01)
(52) U.S. Cl. .................. 365/189.12; 365/221
(58) Field of Classification Search ........... 365/189.12, 365/221, 189.05
See application file for complete search history.

(56) References Cited

U.S. PATENT DOCUMENTS

| | | | | |
|---|---|---|---|---|
| 3,997,882 A | * | 12/1976 | Goyal ......................... 365/49 |
| 4,803,657 A | * | 2/1989 | Giebel et al. ................ 365/221 |
| 5,473,756 A | * | 12/1995 | Traylor ......................... 710/57 |
| 5,768,196 A | * | 6/1998 | Bloker et al. ................ 365/200 |

* cited by examiner

Primary Examiner—Anh Phung (74) Attorney, Agent, or Firm—W. Daniel Swayze, Jr.; W. James Brady; Frederick J. Telecky, Jr.

(57) ABSTRACT

An electronic device (10). The device comprises a memory structure (12) structure comprising an integer M of word storage locations. The device further comprises a shift register ($SR_{RD}$; $SR_{WT}$) for storing a sequence of bits. The sequence in the shift register comprises a number of bits equal to a ratio of $1/R_1$ times the integer M. The device further comprises circuitry (16) for providing a clock cycle to the shift register for selected data operations with respect to any of the word storage locations. The selected data operations are a data read or a data write. In response to each clock cycle, received from the circuitry for providing the clock cycle, the shift register shifts the sequence. Further, one bit in the sequence corresponds to an indication of one of the memory word storage locations from which a word will be read or into which a word will be written.

37 Claims, 10 Drawing Sheets

FIRST-IN FIRST-OUT MEMORY SYSTEM WITH SINGLE BIT COLLISION DETECTION

CROSS-REFERENCES TO RELATED APPLICATIONS

This case is related to U.S. patent application Ser. No. 10/726,913, entitled "First-In First-Out Memory System With Shift Register Fill Indication" (TI-36899), filed on the same date as the present application.

STATEMENT REGARDING FEDERALLY SPONSORED RESEARCH OR DEVELOPMENT

Not Applicable.

BACKGROUND OF THE INVENTION

The present embodiments relate to electronic devices and circuits and are more particularly directed to such devices and circuits that include a first-in first-out ("FIFO") memory system with a single bit indication of an addressed word location in the FIFO.

Electronic circuits are prevalent in numerous applications, including those used in personal, business, and other devices. Demands of the marketplace affect many aspects of the design of these circuits, including factors such as device complexity, size, and cost. Various of these electronic circuits include some aspect of digital signal processing and, quite often, these circuits include storage devices that operate on a FIFO basis. As is well-known in the art, such FIFO circuits are so named because data words are read from the circuit in the same order as they were written to the circuit. As a storage device, the FIFO is also sometimes referred to as a FIFO memory or as a FIFO random access memory ("RAM"). Typically, a FIFO is a logical array for storing a number of data words. The size of each data word in the FIFO depends on the application and may be any number of bits, where 4 bits, 8 bits, 16 bits, and 32 bits are common examples, while any number of bits per word may be implemented based on the application.

A FIFO has a number of word storage locations, and typically in the prior art any of these locations may be indicated, or "addressed," during operation of the FIFO by both a read pointer and a write pointer. Typically, the read pointer indicates the word storage location from which a next word will be read, and the write pointer indicates the word storage location into which a next word will be written. The number of word storage locations in a given FIFO also is typically dictated at least in part by the application. In view of that application, the FIFO design is often determined in an effort to satisfy data requirements while minimizing this number of storage locations so as to avoid unnecessarily enlarging the FIFO. Typically, however, with the designed minimized number of word storage locations, there is an expectation that the pointers may at some instance point to a same word storage location, which in the art is referred to as a collision. When a collision occurs, often an interrupt or the like is generated, because in this condition there is the possibility of an imminent data corrupting action. For example, in a FIFO having word storage locations 0 through Z, if a word has been written into location 0 and the write pointer then points to location 1, consider next that a read occurs of the word at location 0 and the read pointer then also points to location 1. Thus, both pointers point to the same FIFO location. Without any additional action, if the next FIFO operation is a read, then the data read will be at a location that has not yet been written, thereby providing invalid data for the read. As a result, this collision must be detected so as to warn, or prevent, the system from relying on invalid data. As another example in that same FIFO, if Z words have been written into locations 0 through Z of that same FIFO and the write pointer then wraps around to location 0 without any read occurring, then again both pointers point to the same FIFO location. Without any additional action, if the next FIFO operation is a write, then the valid data at location 0, which has not yet been read, will be overwritten. Thus, this collision also must be detected.

In an effort to respond to pointer collisions in a FIFO, the prior art has developed various systems based on monitoring the read and write pointers relative to one another. In these systems, the prior art pointers are typically multiple-bit digital values that numerically identify each word storage location. For example, for the above instance of a FIFO with locations 0 through $Z=2^N-1$, then both the read pointer and the write pointer consist of incrementing modulo counters with N bits that increment through the values of 0 through $2^N-1$ and then start once more at 0 (or vice versa for decrementing counters). Often each such counter is referred to as a pointer vector in that each such vector has multiple bits, where at least one of those multiple bits, by definition, is a different value for each of the $2^N$ different addresses of the FIFO. Given this implementation of pointers, the prior art manner of detecting collisions typically compares the two pointers, where a collision is detected if the pointers have the same counter values. The comparison may be implemented using arithmetic computations such as through use of a comparator or subtracting unit, by ways of example. However, the present inventors have observed that in certain FIFOs, and particularly in asynchronous FIFOs, these techniques may become quite extensive. Specifically, in asynchronous FIFOs, a read may occur according to one tiling domain that is independent of when a write may occur, that is, the read and write operations, and pointers, are asynchronous with respect to one another. As a result, as a necessary element of the pointer comparison technique described above, the prior art also involves a complex manner of taking the value of one pointer into the clock domain of the other pointer so as to provide an accurate comparison of the two to avoid metastability problems. In other words, without such an action, by time a first pointer (e.g., read) is copied and compared to a second pointer (e.g., write), the first pointer may be in the process of changing; further, since each pointer address is represented by a vector, and if that vector is changing at the time it is copied, then some bits in the vector may contain the value before the change while others contain the new value. In this case, the captured vector value would not just be either the previous value or the new value but some totally unknown address instead. Thus, the prior art includes additional circuitry for attempting to accommodate this necessary crossing over of one pointer into the other pointer's time domain. This additional circuitry adds complexity, which consequently increases device size, cost, and power consumption, all of which are undesirable in circuit design, particularly in today's competitive marketplace.

In view of the above, the preferred embodiments as set forth below seek to improve upon the prior art as well as its associated drawbacks.

BRIEF SUMMARY OF THE INVENTION

In the preferred embodiment, there is an electronic device. The device comprises a memory structure comprising an integer M of word storage locations. The device further comprises a shift register for storing a sequence of bits. The sequence in the shift register comprises a number of bits equal to a ratio of $1/R_1$ times the integer M. The device further comprises circuitry for providing a clock cycle to the shift register for selected data operations with respect to any of the word storage locations. The selected data operations are a data read or a data write. In response to each clock cycle, received from the circuitry for providing the clock cycle, the shift register shifts the sequence. Further, one bit in the sequence corresponds to an indication of one of the memory word storage locations from which a word will be read or into which a word will be written.

Other aspects are also disclosed and claimed.

DETAILED DESCRIPTION OF THE INVENTION

Figure 1:
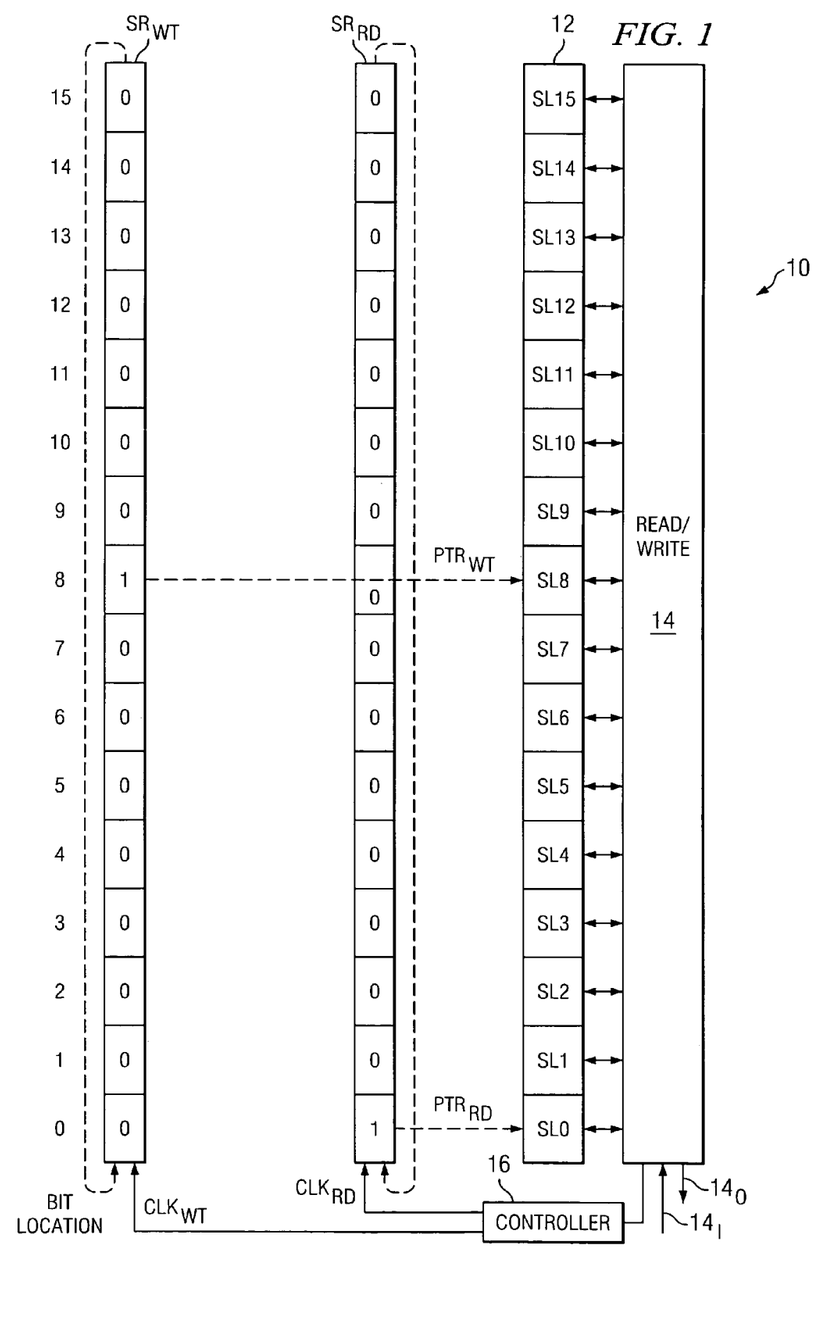
FIG. 1 illustrates a block diagram of a portion of the data storage system according to the preferred embodiments.

FIG. 1 illustrates a block diagram of a data storage system designated generally at 10 according to the preferred embodiments, where certain preferred aspects of system 10 are not shown but are added in later figures so as to simplify the present discussion. In one preferred embodiment, system 10 is constructed using a single integrated circuit. Additional circuitry may be included within such an integrated circuit such as circuitry using the data stored in system 10. However, to simplify the present illustration and discussion, such additional circuitry is neither shown nor described. Moreover, system 10 may be implemented in connection with numerous digital data systems, where one skilled in the art may ascertain such systems.

Looking to the blocks in system 10, system 10 includes various items which in general are known in the prior art, but additional collision-detection aspects as well as related control and operation distinguishes the overall system as detailed later. Looking by way of introduction to some of the blocks that are comparable to the prior art, they include a first-in first-out ("FIFO") memory 12 having a number M of word storage locations; by way of example, M=16 such storage locations are shown and designated SL0 through SL15 and, thus, M also may be represented as $2^N=2^4=M$. However, the choice of N=4 and M=16 is only by way of illustration and one skilled in the art will recognize that the inventive teachings of this document may be implemented in different sized FIFO devices. In the preferred embodiment, each storage location SLx has a same B-bit dimension, where that dimension may be any size. Also included in system 10 are a write pointer $PTR_{WT}$ and a read pointer $PTR_{RD}$. Write pointer $PTR_{WT}$ indicates the word storage location of FIFO memory 12 into which a next word will be written. Read pointer $PTR_{RD}$ indicates the word storage location of FIFO memory 12 from which a next word will be read. As detailed below, however, the advancement of each such pointer is either indicated or tracked in a novel manner consistent with the preferred embodiments. System 10 also includes a data read/write circuit 14 that is bi-directionally connected to each word storage location in FIFO memory 12. Thus, data to be written to FIFO memory 12 is provided to an input $14_I$ of data read/write circuit 14 and is written to the storage location indicated by write pointer $PTR_{WT}$, and data when read out of FIFO memory 12 from a location indicated by read pointer $PTR_{RD}$ is provided at output $14_O$ of data read/write circuit 14. Data read/write circuit 14 may be constructed in various manners.

Turning now to aspects of system 10 as part of the overall inventive structure, system 10 includes a controller 16 coupled to data read/write circuit 14. In addition, controller 16 provides a write clock signal $CLK_{WT}$ to a write shift register $SR_{WT}$ and a read clock signal $CLK_{RD}$ to a read shift register $SR_{RD}$. In the preferred embodiment, each shift register $SR_{WT}$ and $SR_{WT}$ is M bits in length, that is, it is the same number in bits as the number of word storage locations in FIFO memory 12. Preferably, each shift register $SR_{WT}$ and $SR_{WT}$ also is a wraparound device, that is, in response to a respective clock signal each register shifts each bit of its contents one location toward its most significant bit ("MSB") and the MSB bit value wraps around to the least significant bit ("LSB") location as is known in the shift register art. This wraparound functionality of each shift register is shown in FIG. 1 by way of respective dotted arrows from the MSB to the LSB of each shift register.

As further explored below, in one preferred embodiment, one bit in each shift register $SR_{WT}$ and $SR_{WT}$ is loaded with one binary value of one, while the remaining bits of the shift register are loaded-with a binary value of zero. In operation, each binary value of a one in this regard corresponds to the pointer for the respective shift register. Looking at this aspect with respect to write shift register $SR_{WT}$, the sole binary value of one in it corresponds to the location of write pointer $PTR_{WT}$. In the example of FIG. 1, therefore, the sole binary value of one in write shift register $SR_{WT}$ is located at its bit location of 8 (counting, starting from 0, from the lowermost bit location in the Figure), and this value corresponds to the location of write pointer $PTR_{WT}$ which identifies word storage location SL8 in FIFO memory 12. Note, therefore, that write shift register $SR_{WT}$ may be used to directly provide the write pointer, or in an alternative embodiment that pointer may be provided by a separate circuit, including a counter, whereby at the same time that the separate circuit is advanced by write clock $CLK_{WT}$, so is the shifted value in write shift register $SR_{WT}$, so that in all instances the location of the binary one in write shift register $SR_{WT}$ tracks the then-indicated word storage location in FIFO memory 12 by write pointer $PTR_{WT}$. Looking at the same binary loading aspect described above but now in connection with read shift register $SR_{RD}$, the sole binary value of one in it corresponds to the location of read pointer $PTR_{RD}$. In the example of FIG. 1, therefore, the sole binary value of one in read shift register $SR_{RD}$ is located at its bit location of 0 (assuming that location 0 is the lowermost bit location in the Figure), and this value corresponds to the location of read pointer $PTR_{RD}$ which identifies word storage location SL0 in FIFO memory 12. Read shift register $SR_{RD}$ may be used to directly provide the read pointer, or in an alternative embodiment that pointer may be provided by a separate circuit, including a counter, whereby at the same time that the separate circuit is advanced by read clock $CLK_{RD}$, so is the shifted value in read shift register $SR_{RD}$, so that in all instances the location of the binary one in read shift register $SR_{RD}$ tracks the then-indicated word storage location in FIFO memory 12 by read pointer $PTR_{RD}$. These aspects are further explored in the remainder of this document.

Figure 2A:
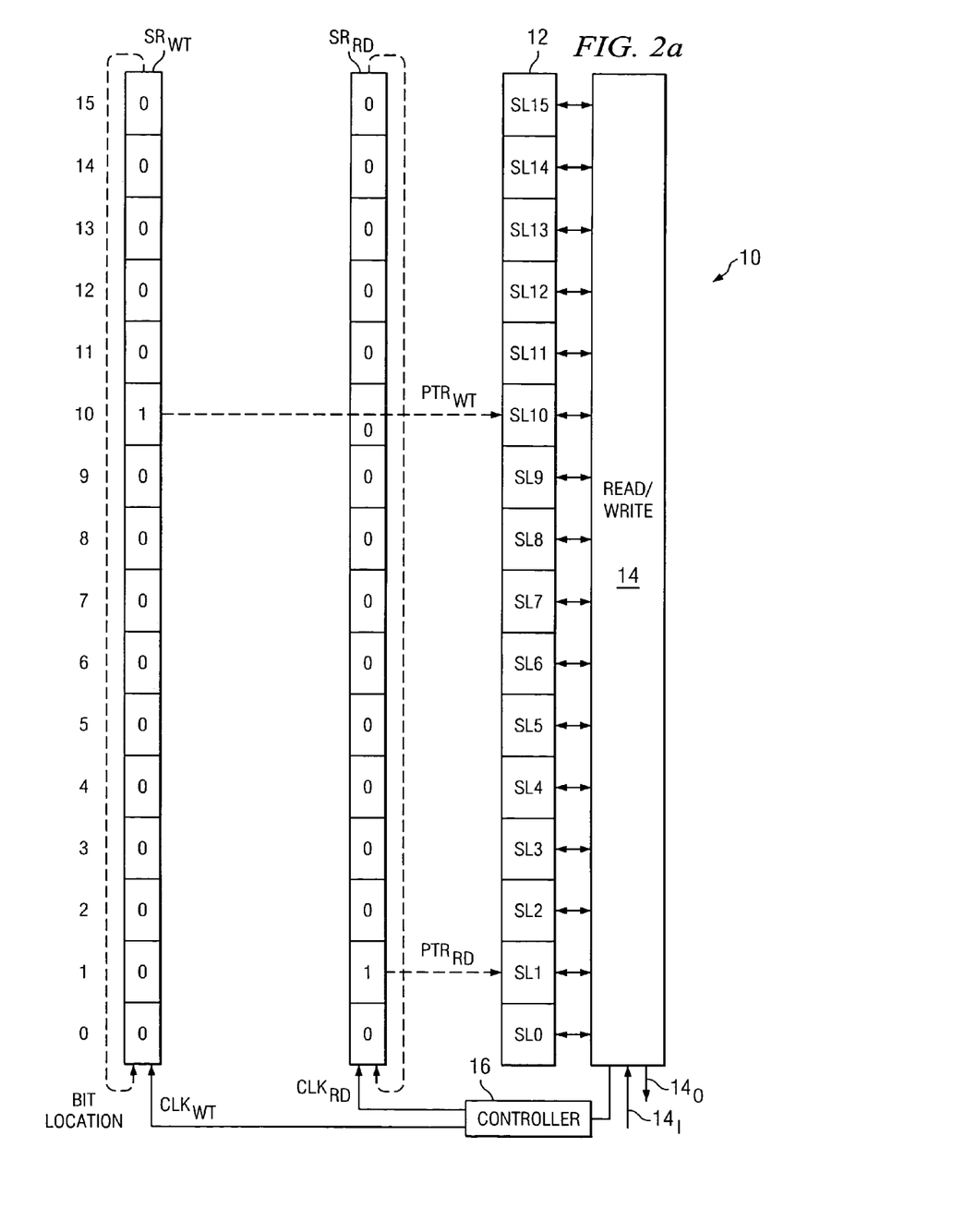
FIG. 2a illustrates one aspect of the operation according to the preferred embodiment as directed to a shifting operation of shift registers $SR_{WT}$ and $SR_{RD}$ for write and read domains respectively.

FIG. 2a illustrates one aspect of the operation of system 10 according to the preferred embodiment, as directed to the above-introduced shifting operation of shift registers $SR_{WT}$ and $SR_{RD}$. Specifically, FIG. 2a illustrates system 10 following two cycles of write clock $CLK_{WT}$ and one cycle of read clock $CLK_{RD}$, which is a possible scenario given the asynchronous nature of these two clocks with respect to one another. With reference to the two cycles of write clock $CLK_{WT}$, each period of write clock $CLK_{WT}$ is provided by controller 16 to write shift register $SR_{WT}$. In response to each period, write shift register $SR_{WT}$ shifts each bit it stores one location toward its MSB, with a wraparound of the bit from its MSB to its LSB. Accordingly, the binary value of one shown in location 8 of FIG. 1 is shifted, in response to the two clock cycles of write clock $CLK_{WT}$, to location 10 in FIG. 2a. Further, because write pointer $PTR_{WT}$ is either directly provided, or tracked, by write shift register $SR_{WT}$, then FIG. 2a also illustrates the advancement of write pointer $PTR_{WT}$ from storage location SL8 in FIG. 1 to storage location SL10 in FIG. 2a. With reference to the one cycle of read clock $CLK_{RD}$, the period of read clock $CLK_{RD}$ is provided by controller 16 to read shift register $SR_{RD}$. In response, read shift register $SR_{RD}$ shifts each bit it stores one location toward its MSB, with a wraparound of the bit from its MSB to its LSB. Accordingly, the binary value of one shown in location 0 of FIG. 1 is shifted, in response to the one clock cycle of read clock $CLK_{RD}$, to location 1 in FIG. 2a. Further, because read pointer $PTR_{RD}$ is either directly provided, or tracked, by read shift register $SR_{RD}$, then FIG. 2a also illustrates the advancement of read pointer $PTR_{RD}$ from storage location SL0 in FIG. 1 to storage location SL1 in FIG. 2a.

Figure 2B:
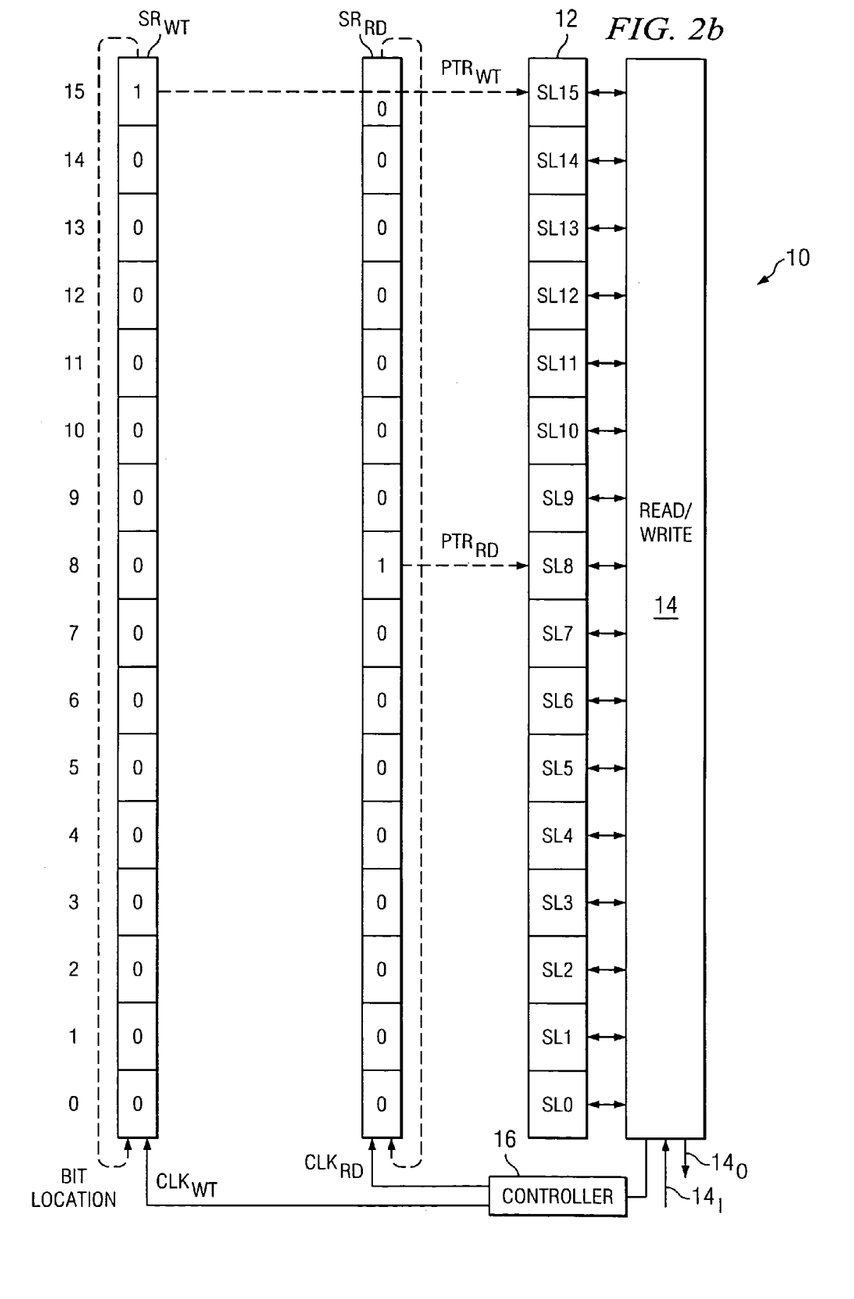
FIG. 2b illustrates the continuing operation of system 10 in FIG. 2a following a total of five additional cycles of write clock $CLK_{WT}$ and of seven additional cycles of read clock $CLK_{RD}$.

FIG. 2b illustrates the continuing operation of system 10 by continuing with an example following the state shown in FIG. 2a. Specifically, FIG. 2b illustrates system 10 following a total of five additional cycles of write clock $CLK_{WT}$ and of seven additional cycles of read clock $CLK_{RD}$, where these cycles occur asynchronously with respect to one another and may occur in various fashions whereby certain ones of the cycles in one domain (i.e., either read or write domain) may be interspersed between cycles in the other domain. In response to the five additional cycles of write clock $CLK_{WT}$, write shift register $SR_{WT}$ shifts its contents five times, thereby advancing the sole value of one in that shift register to bit location 15, thereby causing, or tracking, the positioning of write pointer $PTR_{WT}$ to word storage location SL15 in FIFO memory 12. In response to the seven additional cycles of read clock $CLK_{RD}$, read shift register $SR_{RD}$ shifts its contents seven times, thereby advancing the sole value of one in that shift register to bit location 8 and causing, or tracking, the positioning of read pointer $PTR_{RD}$ to word storage location SL8 in FIFO memory 12.

From the example of FIG. 2b, one skilled in the art should appreciate the general nature of the advancement of shift register values and the corresponding advancement of pointers in system 10, with the remaining discussion pertaining to additional aspects directed to collision detection in FIFO memory 12. However, before proceeding, note that the one-to-one correspondence of M bit locations in each shift register with the M word storage locations in FIFO memory 12 is only one preferred embodiment. In an alternative embodiment, each shift register may have a number of bit locations equal to a ratio 1/R of the M word storage slots in FIFO memory 12, where the value R could differ for each shift register. As an example with R equal to the same value for each shift register, and for R=2, FIFO memory 12 may have M=64 word storage locations while each shift register (or one such register) has $1/R*M=1/2*64=32$ bit locations (i.e., in this case, the ratio is 1/2). In any event, then the shift register shifts its binary sequence once every R times its corresponding pointer is advanced (i.e., clocked) with respect to FIFO memory 12, where in the present example R=2 and, thus, the shift register shifts for every R=2 times the corresponding pointer is advanced. Note also that the example of FIG. 2b, therefore, merely represents the instance where R=1, so both shift registers have $1/R=1*M$ bit locations, and each shift register shifts its binary sequence every time its corresponding pointer is advanced with respect to FIFO memory 12 because R=1. These aspects will be further appreciated by one skilled in the art given the remaining discussion of this document, as well as the implications of how it might slightly affect the timing of a collision detection. For sake of simplifying the discussion, however, the remaining illustrations are directed to the instance where each shift register has a number of M bit locations and, thus, each such register shifts its binary pattern once for each advancement of its corresponding FIFO pointer.

The example of pointer position in FIG. 2b, in combination with the example of pointer position in FIG. 1, further demonstrates an aspect with respect to the preferred resetting of FIFO memory 12. Particularly, the pointer position in FIG. 1 depicts a preferable spacing of write pointer $PTR_{WT}$ and read pointer $PTR_{RD}$ upon reset, which may occur at start-up or as a response following a pointer collision, which is detected according to the preferred embodiments as detailed later. Specifically, in the preferred embodiment, for a FIFO having M word storage locations, then upon reset, read pointer $PTR_{RD}$ and write pointer $PTR_{WT}$ are spaced apart a distance of M/2 storage locations, as may be achieved through control of controller 16. Thus, the reset sequence of bits in read shift register $SR_{RD}$ is offset from the reset sequence of bits in write shift register $SR_{WT}$ by a distance of M/2. This separation, along with the expectation that over time the frequency of each pointer clock is approximately the same as the other pointer clock, reduces the chance that either pointer will advance to collide with the other. Looking then to FIG. 2b, it illustrates, relative to FIG. 2a, a total advancement of seven storage locations by read pointer $PTR_{RD}$ and a total advancement of five storage locations by write pointer $PTR_{WT}$. Thus, as of that time, there is still a considerable storage location distance between the two pointers. In addition, note that the reset position of FIG. 1 will cause the first eight reads of FIFO memory 12 to provide invalid data, as those reads will span storage locations SL0 through SL7, where valid data has not yet been written because write pointer $PTR_{WT}$ is reset to indicate storage location SL8. With this knowledge of the preferred reset positioning, one skilled in the art may ascertain various fashions to ensure that the first eight reads are indicated as invalid. However, once read pointer $PTR_{RD}$ reaches storage location SL8 in a first instance following a reset, and as shown in FIG. 2b, and assuming that no collision then occurs with write pointer $PTR_{WT}$, that is, assuming write pointer $PTR_{WT}$ has advanced such as also shown by way of example in FIG. 2b, then the next read will be of valid data. Once more, one skilled in the art may ascertain various fashions to ensure that such reads are indicated as valid.

Figure 3A:
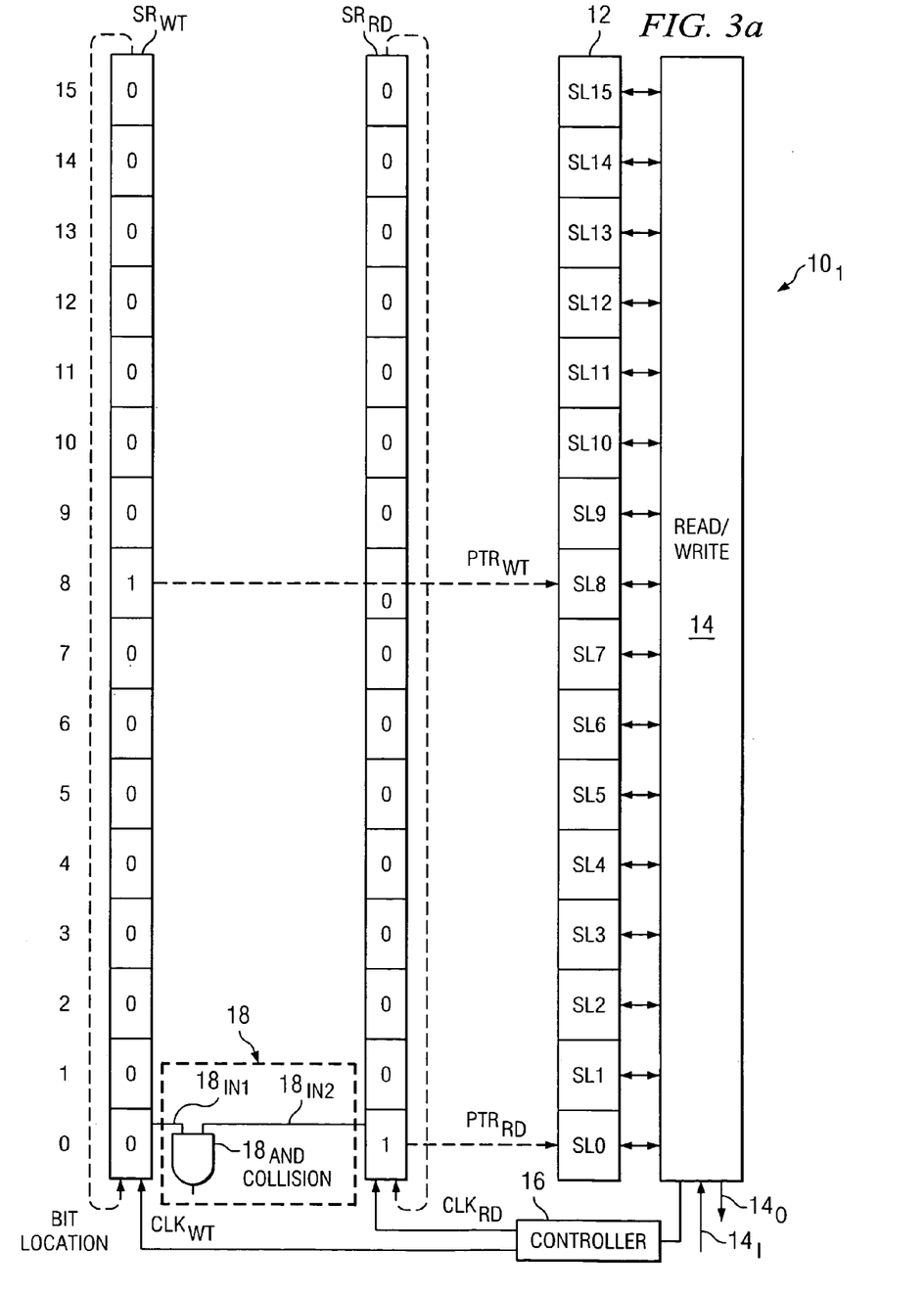
FIG. 3a illustrates system 10 of FIG. 1, with an additional aspect directed to detecting pointer collision and therefore designated by way of distinction as a system $10_1$.

FIG. 3a illustrates system 10 of FIG. 1, with an additional aspect and therefore for sake of distinction the system is shown and referred to as system $10_1$. System $10_1$ includes various of the same components of system 10 from FIG. 1, where for sake of convenience and understanding the reference numbers for these same items are carried forward from FIG. 1 into FIG. 3a (and FIG. 3b, discussed below). Thus, the reader is referred to the previous discussion for details on such aspects. Looking then to the additional aspect of system $10_1$ over system 10, system $10_1$ includes a pointer collision detecting circuit 18. In the preferred embodiment, pointer collision detecting circuit 18 consists of a single stage logic circuit having inputs connected to a same bit location within each of write shift register $SR_{WT}$ and read shift register $SR_{RD}$. More particularly, in the illustrated and preferred embodiment, the single stage consists of a two-input AND gate $18_{AND}$, with a first input $18_{IN1}$ connected to bit location 0 of write shift register $SR_{WT}$ and a second input $18_{IN2}$ connected to bit location 0 of read shift register $SR_{RD}$. The output of AND gate $18_{AND}$ provides a COLLISION signal, which in the present example is active high. Thus, when a collision is detected at the sampled bit locations, a collision between read pointer $PTR_{RD}$ and write pointer $PTR_{WT}$ is occurring and the COLLISION signal is high; otherwise, the COLLISION signal is low.

The binary states stored in write shift register $SR_{WT}$ and read shift register $SR_{RD}$ of FIG. 3a are the same as those shown in FIG. 1. As a result, these shift register values either provide, or are tracking, read pointer $PTR_{RD}$ pointing to storage location SL0 and write pointer $PTR_{WT}$ pointing to storage location SL8. Thus, no collision is presently occurring since those pointers indicate different storage locations within FIFO memory 12. In connection with AND gate $18_{AND}$ of collision detecting circuit 18, one skilled in the art will appreciate that it correctly provides a low COLLISION signal in response to the binary states in bit location 0 of the two shift registers. Specifically, input $18_{IN1}$ receives a binary value of one from bit location 0 of write shift register $SR_{WT}$, and input $18^{IN2}$ receives a binary value of zero from bit location 0 of read shift register $SR_{RD}$. Thus, these inputs provide a low output for the COLLISION signal.

Figure 3B:
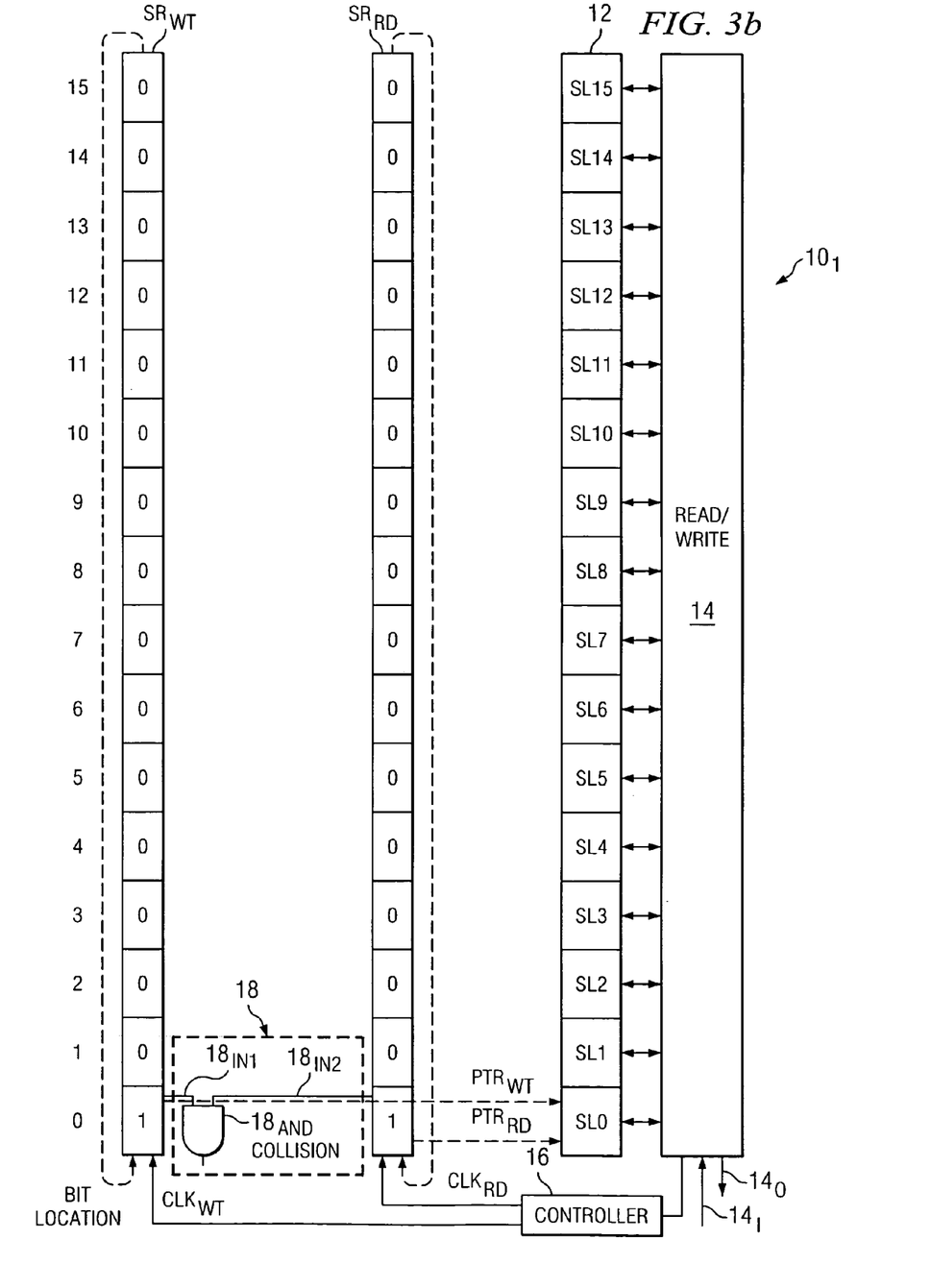
FIG. 3b illustrates system $10_1$ of FIG. 3a and further depicts an instance of a pointer collision.

Looking now to FIG. 3b, it again illustrates system $10_1$, but it further depicts an instance of a pointer collision. Specifically, the binary states stored in write shift register $SR_{WT}$ and read shift register $SR_{RD}$ of FIG. 3b are those which would exist, by way of example, following the state of FIG. 3a and eight cycles of write clock $CLK_{WT}$. As a result, these shift register values either provide, or are tracking, read pointer $PTR_{RD}$ pointing to storage location SL0 and write pointer $PTR_{WT}$ also pointing to storage location SL0. Thus, a collision is presently occurring because those pointers indicate a same storage location within FIFO memory 12. In connection with AND gate $18_{AND}$ of collision detecting circuit 18, one skilled in the art will appreciate that it correctly provides a high COLLISION signal in response to these binary states in bit location 0 of the two shift registers. Specifically, input $18_{IN1}$ receives a binary value of one from bit location 0 of write shift register $SR_{WT}$ and input $18_{IN2}$ receives a binary value of one from bit location 0 of read shift register $SR_{RD}$. These inputs provide a high output for the COLLISION signal.

The preceding demonstrates a preferred embodiment that operates to detect a collision of read and write pointers in a FIFO system. Note that the preferred embodiment achieves its result with a key benefit over the prior art. Specifically, the use of read and write shift registers, advanced by respective read and write clock cycles, permits an instantaneous comparison of a common single bit location in each of the shift registers. As such, there is no need to capture a multiple-bit pointer vector in one clock domain and to take that vector into the clock domain of the other pointer. Further, the collision detection of the preferred embodiment may be implemented in a single logic stage, that is, selected bits are connected to logic where the serial path through that logic only passes through a single gate to provide an indication of a FIFO collision. As such, the collision detection may be achieved with considerably less complexity as compared to the prior art, thereby reducing device size and cost. As another benefit of the preferred embodiment, it may be modified to provide additional embodiments, where certain examples of such embodiments are shown below. As still another benefit, given the asynchronous nature of read clock $CLK_{RD}$ and write clock $CLK_{WT}$, the overlap between two binary ones in the respective shift registers may be for a short period of time, where that shortness in the prior art of an overlap of vector pointers required considerable complexity to accurately detect. In contrast, all that is required in the preferred embodiment is the triggering of a single logic gate. Note also in this regard and for purposes of additional response to the detected collision, the high output of the detecting AND gate may be connected to additional circuitry (not shown) that may be included in detecting circuit 18. For example, the output of the detecting AND gate may be connected as a clear input to two cascaded flip flops, in which case a collision indication, even if detected by the AND gate for a very short period of time, is then effectively extended in time as it is clocked through the cascaded flip flops. With this extended asserted COLLISION signal, FIFO memory 12 may be reset in response to the detected collision, such as by again positioning the binary sequences in the shift registers in the positions indicated in FIG. 1 and also marking the data in FIFO memory 12 invalid. Still other synchronization techniques in response to the detected collision may be ascertained by one skilled in the art.

Figure 4A:
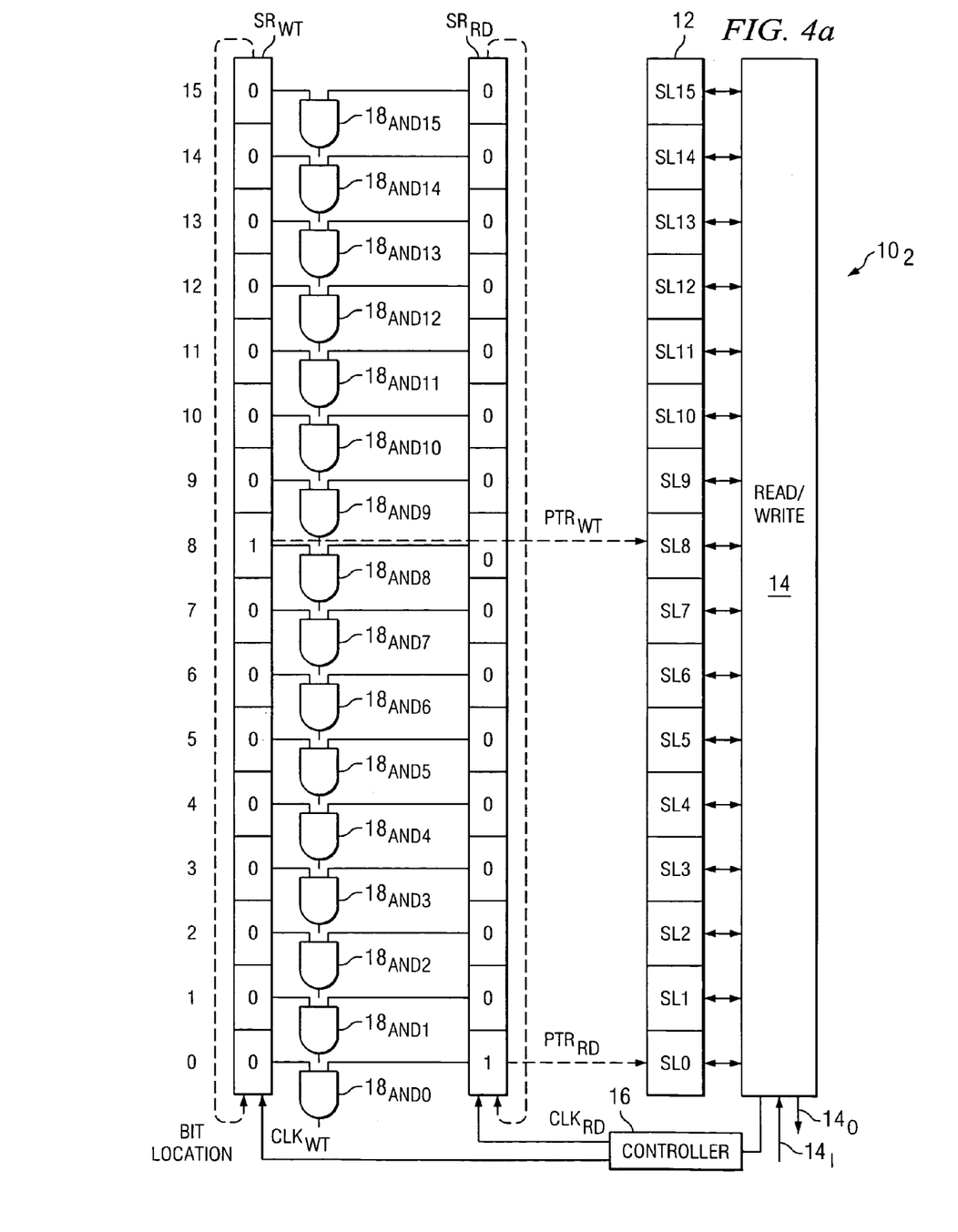
FIG. 4a illustrates system $10_1$ of FIGS. 3a and 3b, with additional aspects directed to detecting a pointer collision at any location of FIFO memory 12 and therefore designated by way of distinction as a system $10_2$.

FIG. 4a illustrates system $10_1$ of FIGS. 3a and 3b, with additional aspects and for sake of distinction the system is shown and referred to as system $10_2$. System $10_2$ includes various of the same components of system $10_1$, where the reference numbers for these same items are carried forward from FIGS. 3a and 3b into FIG. 4a and the reader is referred to the previous discussion for details on such aspects. Looking to the additional aspects of system $10_2$ over system $10_1$, system $10_2$ also includes an AND gate having an input connected to bit location 0 of write shift register $SR_{WT}$ and an input connected to bit location 0 of read shift register $SR_{RD}$, however for sake of distinction from FIG. 3a, in FIG. 4a this AND gate is identified as AND gate $18_{AND0}$. Indeed, system $10_2$ also includes additional respective AND gates, each having one input connected to a bit location of write shift register $SR_{WT}$ and another input connected to a respective same bit location of read shift register $SR_{RD}$. For example, an AND gate $18_{AND1}$ has a first input connected to bit location 1 of write shift register $SR_{WT}$ and a second input connected to bit location 1 of read shift register $SR_{RD}$. As another example, an AND gate $18_{AND2}$ has a first input connected to bit location 2 of write shift register $SR_{WT}$ and a second input connected to bit location 2 of read shift register $SR_{RD}$. Additional AND gates are included up to and including the final bit location of the shift registers, that is, an AND gate $18_{AND15}$ has a first input connected to bit location 15 of write shift register $SR_{WT}$ and a second input connected to bit location 15 of read shift register $SR_{RD}$. Thus, it may be stated by way of summary that each AND gate $18_{ANDx}$ has a first input connected to a bit location x of write shift register $SR_{WT}$ and a second input connected to the bit location x of read shift register $SR_{RD}$. Lastly, by way of introduction, the binary states stored in write shift register $SR_{WT}$ and read shift register $SR_{RD}$ of FIG. 4a are the reset values as shown and described above with respect to FIG. 3a and FIG. 1. Thus, with these binary states in FIG. 4a, no collision is occurring and, hence, each AND gate $18_{AND0}$ through $18_{AND15}$ provides a logic low output (i.e., no collision is detected).

Figure 4B:
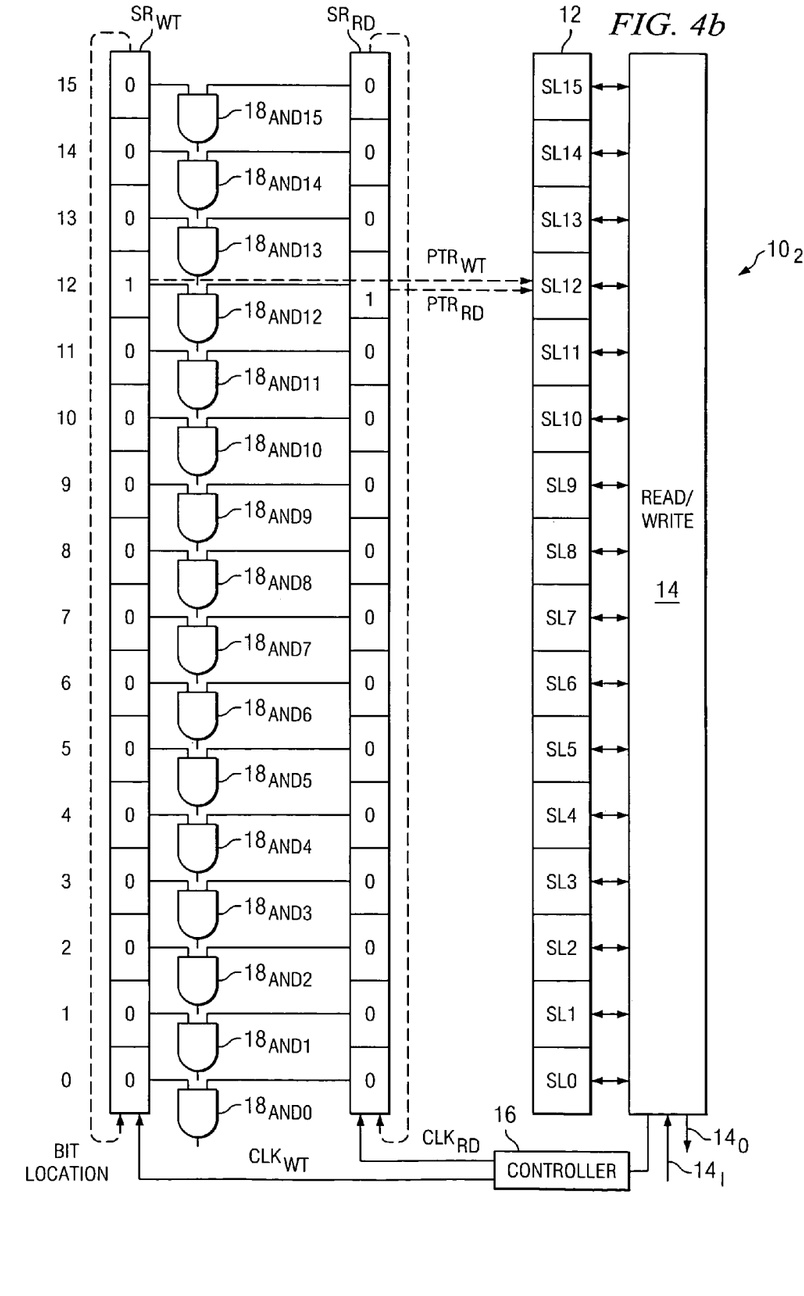
FIG. 4b illustrates the continuing operation of system $10_2$ of FIG. 4a following a total of four additional cycles of write clock $CLK_{WT}$ and of twelve additional cycles of read clock $CLK_{RD}$.

FIG. 4b illustrates the continuing operation of system $10_2$ following the preceding state in FIG. 4a, where FIG. 4b illustrates system $10_2$ following a total of four additional cycles of write clock $CLK_{WT}$ and of twelve additional cycles of read clock $CLK_{RD}$. Again, the clock cycles are asynchronous with respect to one another and may occur in various fashions whereby certain ones of the cycles in one domain may be interspersed between cycles in the other domain. In response to the additional clock cycles, each shift register advances its stored binary state in the same manner as described in previous examples, so that the sole value of one in write shift register $SR_{WT}$ is at its bit location 12 and so that the sole value of one in read shift register $SR_{RD}$ is at its bit location 12. Consequently, these bit location values provide, or track, the positioning of write pointer $PTR_{WT}$ and read pointer $PT_{RD}$, both of which indicate word storage location SL12 in FIFO memory 12.

Given that, in FIG. 4b, write pointer $PTR_{WT}$ and read pointer $PTR_{RD}$ both indicate a same position in FIFO memory 12, then by definition a pointer collision is occurring. Further, recall that a two-input AND gate $18_{AND12}$ has its two inputs connected, respectively, to bit location 12 of write shift register $SR_{WT}$ and read shift register $SR_{RD}$. Thus, given the binary value of one in the common bit location 12 of those shift registers, in FIG. 4b the output of AND gate $18_{AND12}$ will be high, thereby indicating the collision event. Further, at this time, the output of the other 15 AND gates $18_{AND0}$ through $18_{AND11}$ and $18_{AND13}$ through $18_{AND15}$ will be low. However, while not shown, if the preferred detection is only to determine that a collision has occurred and with no desire to identify the word storage location at which the collision occurred, then the outputs of all AND gates $18_{ANDx}$ may be logically OR'd so that if any one of those outputs is high, then a pointer collision is thereby detected by that high output. Conversely, where such an OR'd output (or all outputs of all AND gates $18_{ANDx}$) is low, then no pointer collision is then occurring.

By comparing system $10_2$ (FIGS. 4a and 4b) with system $10_1$ (FIGS. 3a and 3b), one skilled in the art will appreciate that in either instance a high output from an AND gate indicates a pointer collision. In system $10_2$, a collision of the pointers at any word storage location SLx in FIFO memory 12 is detectable, while in system $10_1$, a collision at only one of the word storage locations (e.g., SL0) in FIFO memory 12 is detectable. Thus, a trade-off exists as between the two embodiments in that system $10_2$ will detect any collision, but in doing so requires M AND gates for a FIFO with M word storage locations. Alternatively, system $10_1$ detects only a collision at a single storage location in FIFO memory 12, but given that the read and write clocks are assumed to be relatively the same in frequency over time, then such an approach may be acceptable because within a period of time, which may be deemed acceptable in various implementations, an undetected collision that occurs in a word storage location other than the one to which the AND gate is connected also will be followed by a detected collision at the word storage location (e.g., SL0) that is monitored by an AND gate. Further, still other embodiments may be implemented with a different number of AND gates as between the extremes of systems $10_1$ and $10_2$, that is, for a FIFO with M word storage locations, then a number of AND gates between 1 and M, such as M/2, also may be implemented where each such AND gate has its inputs connected to a different pair of like-positioned bit locations in write and read shift registers $SR_{WT}$ and $SR_{RD}$, respectively.

Figure 5A:
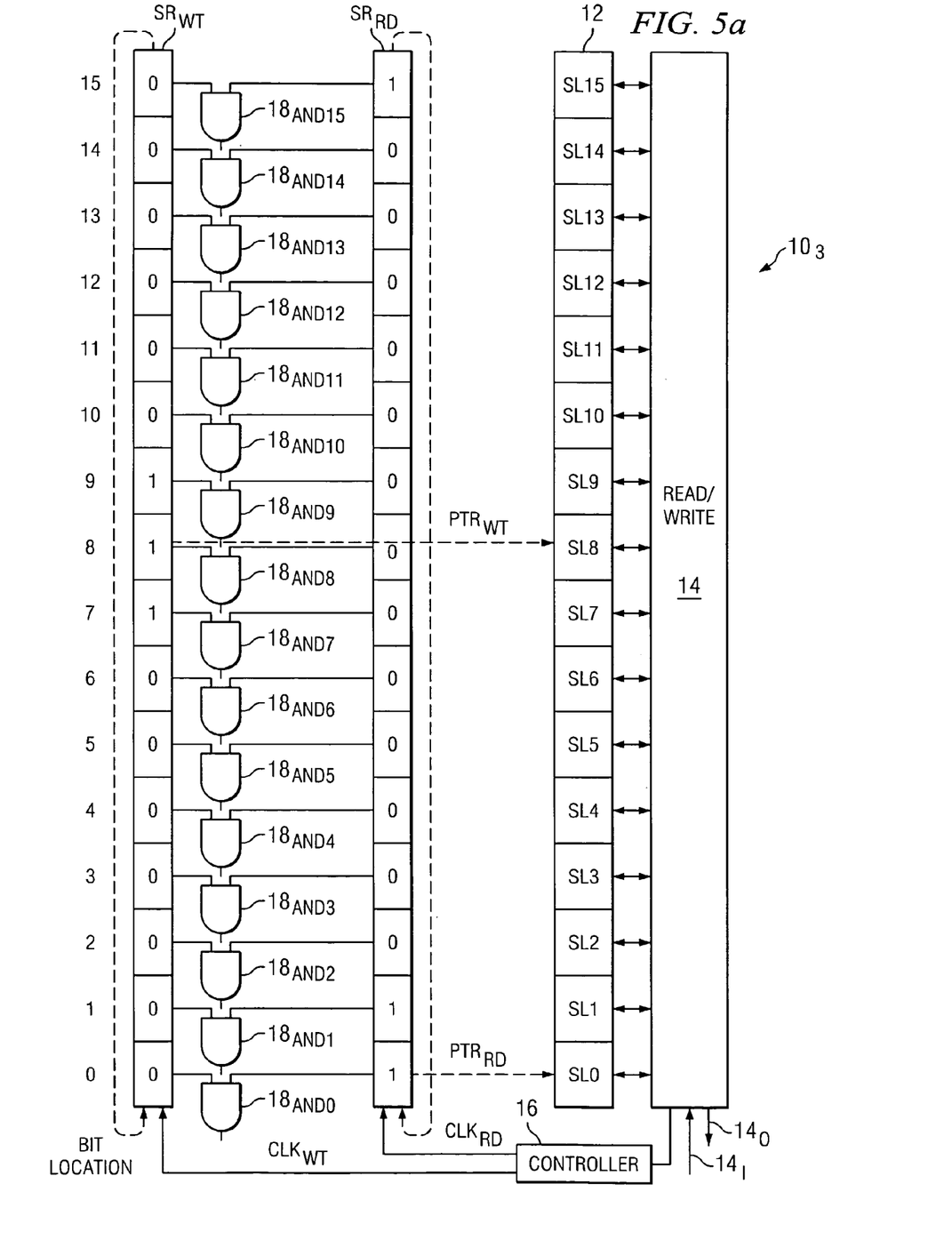
FIG. 5a illustrates a system $10_3$ that is the same as system $10_2$ of FIGS. 4a and 4b, with a modification to the binary string stored in both shift registers $SR_{WT}$ and $SR_{RD}$ and thereby presenting yet another alternative preferred embodiment.

FIG. 5a illustrates a system $10_3$ that is the same as system $10_2$ of FIGS. 4a and 4b, with a modification to the binary string stored in both shift registers $SR_{WT}$ and $SR_{RD}$ and thereby presenting yet another alternative preferred embodiment. Particularly, in system $10_3$, again each of shift registers $SR_{WT}$ and $SR_{RD}$ stores a set of binary values that includes a single one that provides or tracks a respective pointer, and in the example illustrated those values of one are located at the above-discussed preferred reset position. Thus, a binary one is stored in bit location 0 of read shift register $SR_{RD}$ thereby corresponding to word storage location SL0 in FIFO memory 12, and a binary one is stored in bit location 8 of write shift register $SR_{WT}$ thereby corresponding to word storage location SL8 in FIFO memory 12. However, each set of binary values, in a shift register, also includes one or more additional binary values of one that are contiguous to another binary value of one. In the example shown, in write shift register $SR_{WT}$, a binary value of one is also stored in bit location 7 and bit location 9, thus providing three contiguous binary values of one in that register. Also in the example shown, in read shift register $SR_{RD}$, a binary value of one is also stored in bit location 1 and bit location 15, thus providing three contiguous binary values of one in that register (recognizing that bit location 15 is considered contiguous to bit location 0 due to the wraparound nature of the shift register). As detailed below, the additional binary values of one in each such shift register operate as a guard band for detecting a near-collision event.

Figure 5B:
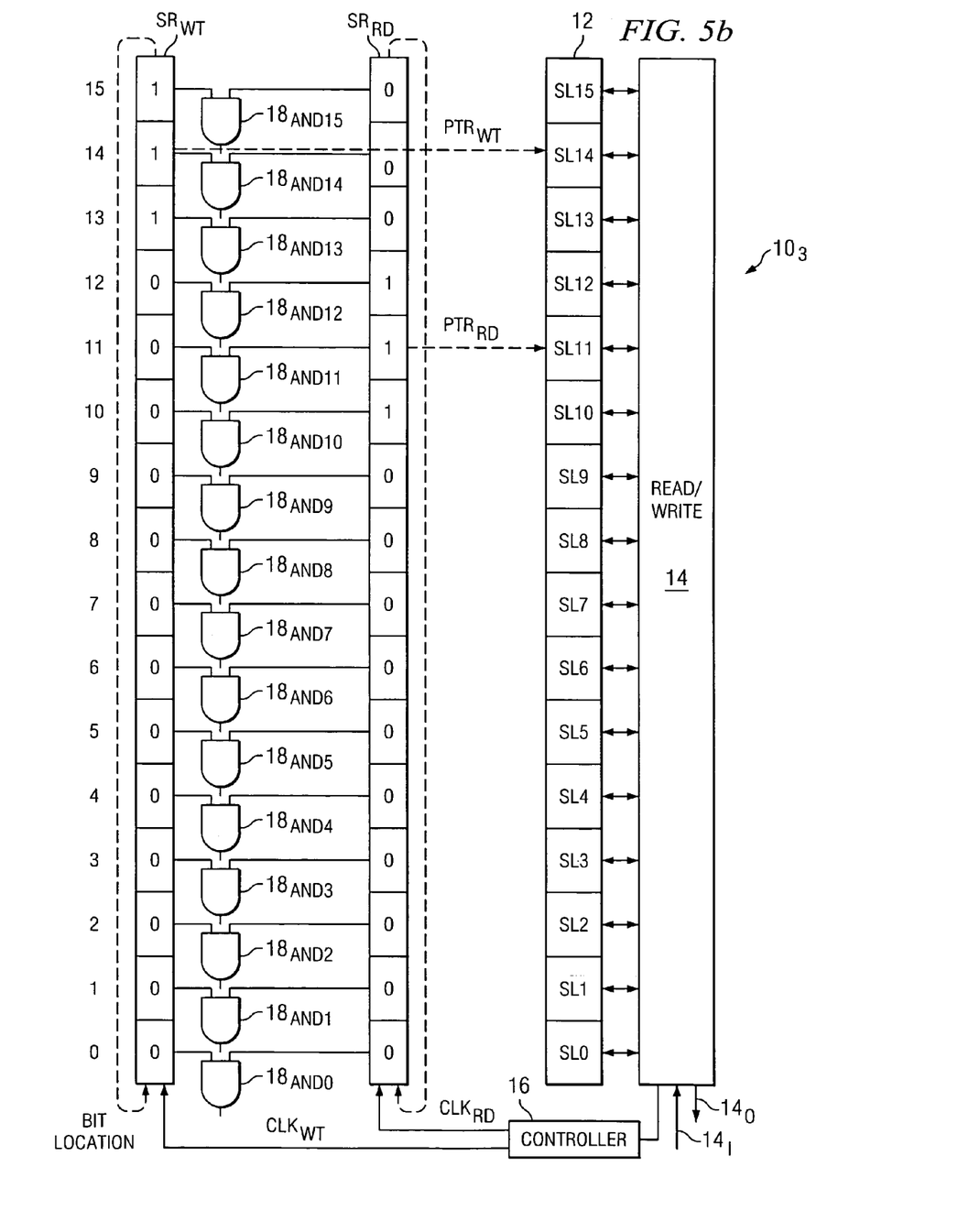
FIG. 5b illustrates the continuing operation of system $10_3$ of FIG. 5a following a total of six additional cycles of write clock $CLK_{WT}$ and of eleven additional cycles of read clock $CLK_{RD}$.

FIG. 5b illustrates the continuing operation of system $10_3$ following the preceding state in FIG. 5a, where FIG. 5b illustrates system $10_3$ following a total of six additional cycles of write clock $CLK_{WT}$ and of eleven additional cycles of read clock $CLK_{RD}$. In response to the six write clock cycles, the centered value of one in write shift register $SR_{WT}$ is located at bit location 14, thereby causing, or tracking, the positioning of write pointer $PTR_{WT}$ to word storage location SL14 in FIFO memory 12. In response to the eleven read clock cycles, the centered value of one in read shift register $SR_{RD}$ is located at bit location 11, thereby causing, or tracking, the positioning of read pointer $PTR_{RD}$ to word storage location SL11 in FIFO memory 12. Given the relative positioning of the binary values of one in both of the shift registers, note that none of the AND gates in system $10_3$ receives an input of one at both of its two inputs. Accordingly, there is no collision detected, which is appropriate in that write pointer $PTR_{WT}$ and read pointer $PTR_{RD}$ are pointing to different locations within FIFO memory 12.

Figure 5C:
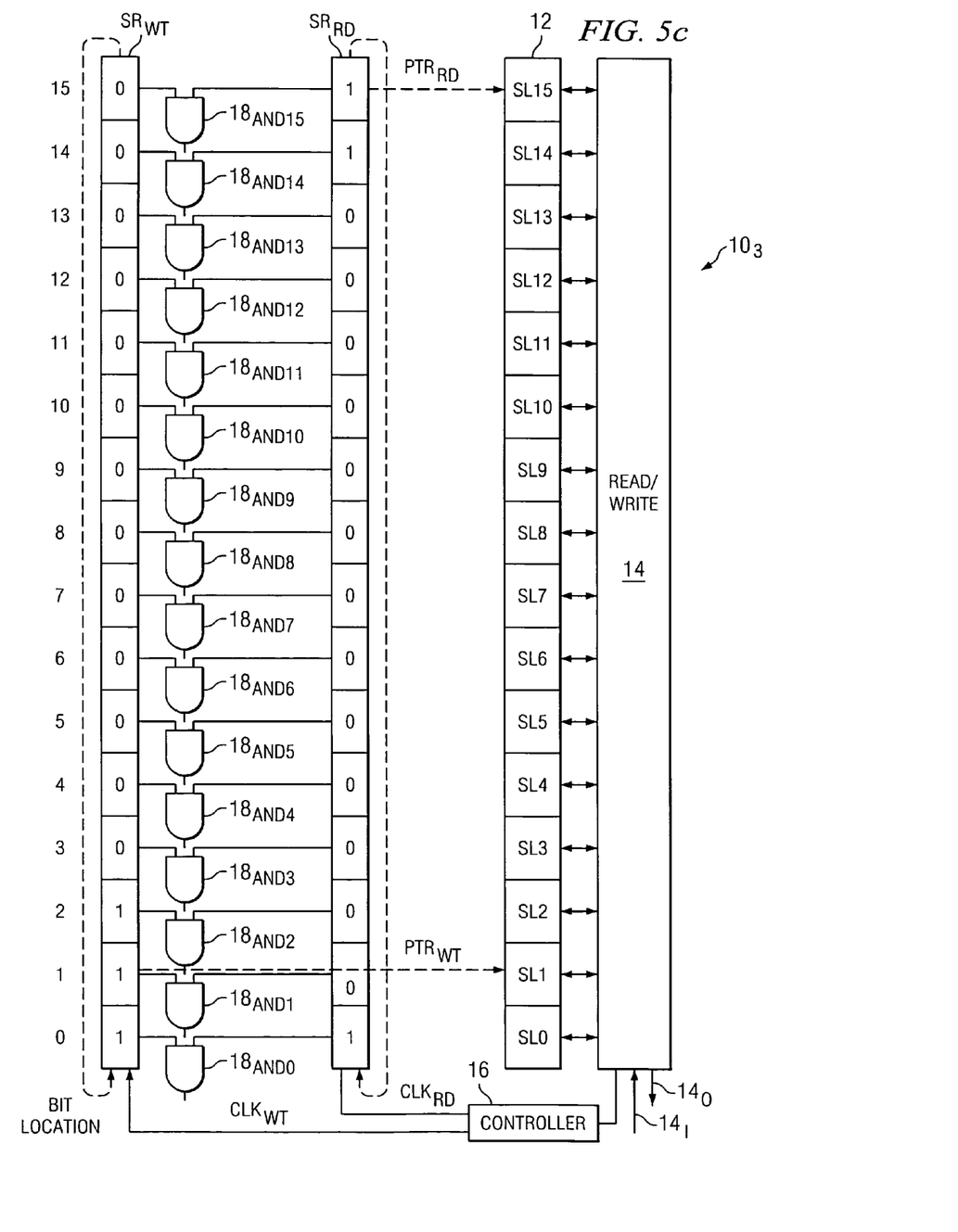
FIG. 5c illustrates the continuing operation of system $10_3$ of FIG. 5b following a total of three additional cycles of write clock $CLK_{WT}$ and of four additional cycles of read clock $CLK_{RD}$.

FIG. 5c illustrates the continuing operation of system $10_3$ following the preceding state in FIG. 5b, where FIG. 5c illustrates system $10_3$ following a total of three additional cycles of write clock $CLK_{WT}$ and of four additional cycles of read clock $CLK_{RD}$. In response to the three write clock cycles, the centered value of one (i.e., the one in the middle of the guard band) in write shift register $SR_{WT}$ is located at bit location 1, thereby causing, or tracking, the positioning of write pointer $PTR_{WT}$ to word storage location SL1 in FIFO memory 12. In response to the four read clock cycles, the centered value of one in read shift register $SR_{RD}$ is located at bit location 15, thereby causing, or tracking, the positioning of read pointer $PTR_{RD}$ to word storage location SL15 in FIFO memory 12.

Given the relative positioning of the pointers in FIG. 5c, no actual collision has yet occurred. However, with the addition of the guard band binary values of one in both of the shift registers, note further that AND gate $18_{AND0}$ receives a binary value of one at both of its inputs; accordingly, the output of that AND gate $18_{AND0}$ is high, which in the embodiment of system $10_3$ is understood to mean that either an actual collision is occurring, or given the guard band created by the additional binary one adjacent each side of the centered binary one in each binary state stored in a shift register, a high output from an AND gate also may indicate that the guard band of one register is overlapping a value of one in the other register, meaning either a collision will occur in the next two clock cycles, is occurring, or occurred in the preceding two clock cycles. In any event, with the guard band, then a reset or other corrective action may be taken in response to any of these three occurrences. In addition, note that for either the implementation of a version of system 10 without a guard band or with a guard band, the number of bits in a shift register set to a value of one is preferably less than the number of contiguous bits that are set to zero, so as to provide the detection functionality while not eliminating too many usable locations in FIFO memory 12 because the greater number of bits equal to one, the fewer the number of successive clock cycles that may occur for one or the other clock cycle without causing a collision or a near-collision. Moreover, note that the size of the guard band (i.e., the number of binary ones in the illustrated example) in one shift register need not necessarily be the same as the size of the guard band of the other shift register.

From the above, it may be appreciated that the above embodiments provide a FIFO memory circuit memory system with a single bit indication of a word pointer. The single bit corresponds to the FIFO word storage location indicated by the word pointer in that it may provide, or track, the pointer, and this approach provides various benefits. As an example, with this approach, both the read and write pointers may be represented by respective shift registers, where in those registers a single binary state (e.g., one) corresponds to the FIFO word storage location indicated by the respective word pointer. The correspondence between the single shifted binary one and the respective FIFO pointer may be direct whereby the binary one provides the FIFO pointer or indirect whereby the binary one tracks the FIFO pointer, such as being advanced each time the FIFO pointer is advanced (or once for every R times the FIFO pointer is advanced). Moreover, note that the correspondence between the single shifted binary one and the respective FIFO pointer may involve an offset between the two. In other words, the preceding has demonstrated examples where the binary value of one has a same bit location in a shift register as the corresponding word storage location in FIFO memory 12, that is, at a bit location m in a shift register corresponds to a pointer indication of word storage location m in FIFO memory 12. Alternatively, the selected value of one (or zero) may still correspond to a word storage location with a known offset as between the bit locations in the shift register and the word storage location in FIFO memory 12. As another example, with that indication, an additional aspect permits comparison of the binary states in the two shift registers so that a collision is detected, either as an absolute collision when using a single bit in a state that is complementary to all other bits in the shift register, or as a guard banded collision when using a group of contiguous bits in a state that is complementary to all other bits in the shift register. As still another example, the comparison may be achieved with a single stage of logic (e.g., AND) and without requiring a complex capture of an entire pointer vector in one clock domain and the transfer of that vector into the other pointer's domain so as to detect collision. As yet another example, the preferred embodiments are readily scalable for different sized FIFOs having differing number of word storage locations and differing numbers of word sizes. In all such approaches, further benefits are realized in that the overall size, complexity, power consumption, and cost of the FIFO and hence the system using the FIFO is reduced. As a final example, the preferred embodiments include variations described above, where certain of those variations may be further applied within the illustrated embodiments; for example, the guard band approach of FIGS. 5a and 5b may be implemented with less than M AND gates as illustrated in the non-guard band case of FIGS. 3a and 3b. Still further, other examples exist and/or may be ascertained by one skilled in the art. For example, while the binary value of one has been shown to be the minority value in each shift register and corresponding to the location of the respective word storage location, a simple complement may be made to the above illustrations where the majority value in each shift register is a binary one while a binary zero, with or without additional zeroes as a guard band, corresponds to the pointer location of the respective word storage location in FIFO memory 12. Thus, these examples provide yet other bases from which one skilled in the art may ascertain yet other benefits and variations, and indeed while the present embodiments have been described in detail, various substitutions, modifications or alterations could be made to the descriptions set forth above without departing from the inventive scope which is defined by the following claims.

What is claimed is:

1. An electronic device, comprising:
   a memory structure comprising an integer M of word storage locations;

a shift register for storing a sequence of bits, wherein the sequence in the shift register comprises a number of bits equal to a ratio of $1/R_1$ times the integer M; and circuitry for providing a clock cycle to the shift register for selected data operations with respect to any of the word storage locations, wherein the selected data operations are a data read or a data write;

wherein in response to each clock cycle, received from the circuitry for providing the clock cycle, the shift register shifts the sequence; and wherein one bit in the sequence corresponds to an indication of one of the memory word storage locations from which a word will be read or into which a word will be written.

2. The electronic device of claim 1:

wherein the sequence comprises a first number of bits of a first state;

wherein the sequence comprises a second number of contiguous bits of a second state that is complementary to the first state; and wherein the first number plus the second number equals the ratio of $1/R_1$ times the integer M.

3. The electronic device of claim 2 wherein the first number of bits includes the one bit in the sequence that corresponds to an indication of one of the memory word storage locations.

4. The electronic device of claim 3 wherein the first number of bits is less than the second number of contiguous bits.

5. The electronic device of claim 4 wherein the first number of bits equals one bit.

6. The electronic device of claim 4 wherein the first number of bits is greater than one bit.

7. The electronic device of claim 4 wherein the first number of bits equals three bits.

8. The electronic device of claim 1:

wherein the shift register comprises a write shift register;

wherein the circuitry for providing is for providing a write clock cycle to the write shift register for selected write data operations with respect to any of the word storage locations;

wherein in response to each write clock cycle, received from the circuitry for providing the write clock cycle, the write shift register shifts the sequence in the write register;

wherein one bit in the sequence in the write register corresponds to an indication of one of the memory word storage locations into which a word will be written;

and further comprising a read shift register for storing a sequence of bits, wherein the sequence stored in the shift register comprises a number of bits equal to a ratio of $1/R_2$ times the integer M;

wherein the circuitry for providing is further for providing a read clock cycle to the read shift register for selected read data operations with respect to any of the word storage locations;

wherein in response to each read clock cycle, received from the circuitry for providing the read clock cycle, the read shift register shifts the sequence in the read register; and wherein one bit in the sequence in the read shift register corresponds to an indication of one of the memory word-storage locations from which a word will be read.

9. The electronic device of claim 8 and further comprising circuitry for detecting a collision with respect to one location of the word storage locations, wherein the collision comprises either a potential write of data over unread data in the one location or a potential read of invalid data in the one location.

10. The electronic device of claim 9 wherein the circuitry for detecting a collision comprises a single logic stage having a first input coupled to the read shift register and a second input coupled to the write shift register.

11. The electronic device of claim 10 wherein the first input is coupled to a single bit location in the read shift register and the second input is coupled to a single like-positioned bit location in the write shift register.

12. The electronic device of claim 11 wherein the circuitry for detecting a collision comprises an AND gate.

13. The electronic device of claim 10 wherein each of the write shift register and the read shift register comprises a wraparound shift register.

14. The electronic device of claim 10 and further comprising, responsive to the circuitry for detecting a collision, circuitry for resetting a sequence of bits in the read shift register and for resetting a sequence of bits in the write shift register.

15. The electronic device of claim 14 wherein the reset sequence of bits in the read shift register is offset from the reset sequence of bits in the write shift register by a distance of the integer M divided by two.

16. The electronic device of claim 9 wherein the circuitry for detecting comprises, for each bit location in the write shift register and for a respective bit location in the read shift register, a single logic stage having a first input coupled to the bit location in the write shift register and a second input coupled to the respective bit location in the read shift register.

17. The electronic device of claim 8 wherein each of the write shift register and the read shift register comprises a wraparound shift register.

18. The electronic device of claim 8:

wherein the sequence in the read shift register comprises a first number of bits of a first state;

wherein the sequence in the read shift register comprises a second number of contiguous bits of a second state that is complementary to the first state in the read shift register; and wherein the first number in the read shift register plus the second number in the read shift register equals the ratio of $1/R_2$ times the integer M.

19. The electronic device of claim 18 wherein the first number of bits in the read shift register includes the one bit in the sequence in the read shift register that corresponds to an indication of one of the memory word storage locations.

20. The electronic device of claim 19 wherein the first number of bits in the read shift register is less than the second number of contiguous bits in the read shift register.

21. The electronic device of claim 20 wherein the first number of bits in the read shift register equals one bit.

22. The electronic device of claim 20 wherein the first number of bits in the read shift register is greater than one bit.

23. The electronic device of claim 20 wherein the first number of bits in the read shift register equals three bits.

24. The electronic device of claim 8:

wherein the sequence in the write shift register comprises a first number of bits of a first state;

wherein the sequence in the write shift register comprises a second number of contiguous bits of a second state that is complementary to the first state in the write shift register; and wherein the first number in the write shift register plus the second number in the write shift register equals the integer $1/R_1$ times the integer M.

25. The electronic device of claim 8 wherein $R_1$ equals $R_2$.

26. The electronic device of claim 8 wherein $R_1$ and $R_2$ both equal one.

27. The electronic device of claim 8:

wherein the circuitry for providing a write clock cycle to the write shift register for selected write data operations provides a write clock cycle for every $R_1$ write data operations with respect to any of the word storage locations; and wherein the circuitry for providing a read clock cycle to the read shift register for selected read data operations provides a read clock cycle for every $R_2$ read data operations with respect to any of the word storage locations.

28. A method of operating an electronic device, the electronic device comprising a memory structure comprising an integer M of word storage locations, the method comprising:

providing a plurality of clock cycles;

for each clock cycle in the plurality of clock cycles, performing a data operation with respect to any of the word storage locations, wherein the data operation is a data read or a data write;

for selected ones of the clock cycles, shifting a sequence bits, the sequence of bits comprising a number of bits equal to a ratio of $1/R_1$ times the integer M;

wherein one bit in the sequence corresponds to an indication of one of the word storage locations from which a word will be read or into which a word will be written.

29. The method of claim 28:

wherein the sequence comprises a first number of bits of a first state;

wherein the sequence comprises a second number of contiguous bits of a second state that is complementary to the first state; and wherein the first number plus the second number equals the ratio of $1/R_1$ times the integer M.

30. The method of claim 29 wherein the first number of bits includes the one bit in the sequence that corresponds to an indication of one of the memory word storage locations.

31. The method of claim 30 wherein the first number of bits is less than the second number of contiguous bits.

32. The method of claim 28:

wherein the providing step is for providing a plurality of write clock cycles;

wherein the step of performing a data operation comprises, for each write clock cycle in the plurality of write clock cycles, performing a write data operation with respect to any of the word storage locations;

wherein the step of shifting a sequence comprises, for selected write clock cycles in the plurality of write clock cycles, operating a write shift register to shift the sequence in the write shift register;

wherein one bit in the sequence in the write register corresponds to an indication of one of the memory word storage locations into which a word will be written;

and further comprising:

providing a plurality of read clock cycles;

for each read clock cycle in the plurality of read clock cycles, performing a read data operation with respect to any of the word storage locations;

for selected ones of the read clock cycles, shifting a sequence of bits in a read shift register, the sequence of bits in the read shift register comprising a number of bit equal to a ratio of $1/R_2$ times the integer M;

wherein one bit in the sequence in the read shift register corresponds to an indication of one of the memory word storage locations from which a word will be read.

33. The method of claim 32 and further comprising detecting a collision with respect to one location of the word storage locations, wherein the collision comprises either a potential write of data over unread data in the one location or a potential read of invalid data in the one location.

34. The method of claim 33 wherein the step of detecting a collision comprises operating a single logic stage having a first input coupled to the read shift register and a second input coupled to the write shift register.

35. The method of claim 32 wherein $R_1$ equals $R_2$.

36. The method of claim 32 wherein $R_1$ and $R_2$ both equal one.

37. The method of claim 32:

wherein the step of operating a write shift register for selected write clock cycles comprise operating the write shift register for every $R_1$ write clock cycles; and wherein the step of operating a read shift register for selected read clock cycles comprise operating the read shift register for every $R_2$ read clock cycles.

* * * * *